United States Patent
Goto et al.

(10) Patent No.: US 9,228,828 B2
(45) Date of Patent: Jan. 5, 2016

(54) THICKNESS MONITORING DEVICE, ETCHING DEPTH MONITORING DEVICE AND THICKNESS MONITORING METHOD

(71) Applicant: SHIMADZU CORPORATION, Kyoto-shi, Kyoto (JP)

(72) Inventors: Hiroomi Goto, Kyoto (JP); Yuzo Nagumo, Kyoto (JP); Rui Kato, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 239 days.

(21) Appl. No.: 13/902,061

(22) Filed: May 24, 2013

(65) Prior Publication Data
US 2013/0334422 A1 Dec. 19, 2013

(30) Foreign Application Priority Data
Jun. 19, 2012 (JP) .................. 2012-138086

(51) Int. Cl.
*G01B 11/06* (2006.01)

(52) U.S. Cl.
CPC ........ *G01B 11/0675* (2013.01); *G01B 11/0633* (2013.01)

(58) Field of Classification Search
CPC . G01B 11/06; G01B 11/0633; G01B 11/0675
See application file for complete search history.

(56) References Cited

U.S. PATENT DOCUMENTS

| | | |
|---|---|---|
| 6,589,869 B2 | 7/2003 | Sarfaty et al. |
| 6,815,228 B2 | 11/2004 | Usui et al. |
| 6,903,826 B2 | 6/2005 | Usui et al. |
| 7,009,714 B2 | 3/2006 | Ohmoto et al. |
| 7,009,715 B2 | 3/2006 | Usui et al. |
| 7,259,866 B2 | 8/2007 | Usui et al. |
| 2009/0066965 A1* | 3/2009 | Jayaraman et al. ........... 356/497 |

FOREIGN PATENT DOCUMENTS

JP 2000-292129 A 10/2000

* cited by examiner

*Primary Examiner* — Mark R Gaworecki
(74) *Attorney, Agent, or Firm* — Sughrue Mion, PLLC

(57) ABSTRACT

A thickness monitoring device capable of performing thickness measurement of an object of measurement in real time even when using a relatively narrow band light source. This etching monitoring device (thickness monitoring device) includes a light source which produces measurement light having a predetermined wavelength bandwidth; an array detector which detects, for each wavelength, interference light of measurement light reflected from mask, whereof the thickness changes over time; and data processing unit which computes the thickness of the mask based on change over time of a plurality of single-wavelength components of the interference light detected by the array detector.

12 Claims, 7 Drawing Sheets

US 9,228,828 B2

Figure 1:
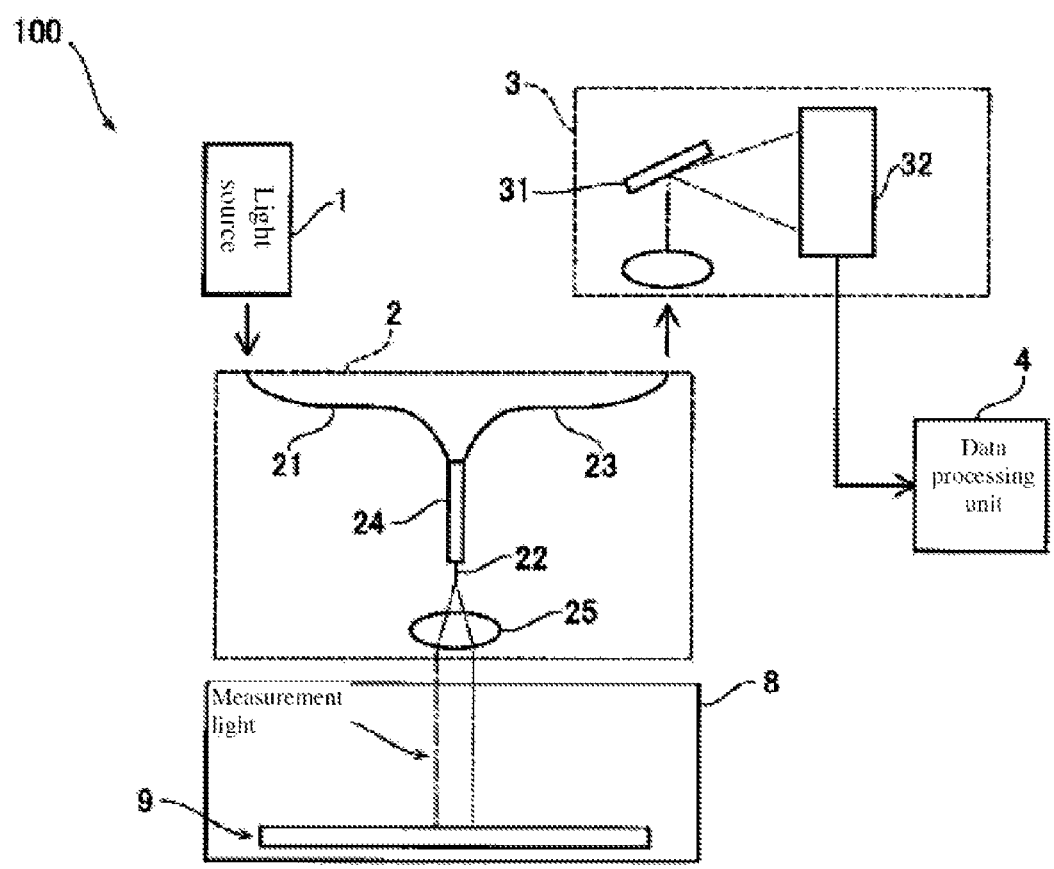

THICKNESS MONITORING DEVICE, ETCHING DEPTH MONITORING DEVICE AND THICKNESS MONITORING METHOD

TECHNICAL FIELD

The present invention relates to a thickness monitoring device, etching depth monitoring device and thickness monitoring method, particularly to a thickness monitoring device, etching depth monitoring device and thickness monitoring method using interference light.

BACKGROUND ART

A mask thickness monitoring device which measures the thickness of an etching mask (object of measurement) using interference light is known in the prior art (for example, see Patent Literature 1).

The aforementioned Patent Literature 1 discloses a mask thickness monitoring device comprising a tungsten lamp which irradiates a specimen, wherein an etching mask has been formed on a silicon wafer, with measurement light; a spectrometer which detects interference light due to light reflected from the etching mask and outputs a spectrometric spectrum; and a mask thickness computation unit which computes the mask thickness based on curve fitting of a theoretical waveform and a spectrum waveform of the interference light intensity-wavelength obtained from the spectrometer. It will be noted that the tungsten lamp is a wide band light source which produces white light.

PRIOR ART LITERATURES

Patent Literature 1

Japanese Unexamined Patent Application Publication 2000-292129

SUMMARY OF THE INVENTION

However, in the aforementioned Patent Literature 1, it is necessary to employ a wide band spectrometer compatible with the wide band tungsten lamp, so there is the problem that the influence of chromatic aberration of the optical system is substantial and the design of the optical system becomes difficult. Furthermore, with a wide band light source such as a tungsten lamp, compared to a single wavelength light source such as a laser, the luminance is low, and the sensor exposure time has to be made longer at the time of measurement. Thus, there is the problem that thickness measurement takes a long time, making it difficult to perform real-time thickness monitoring.

Thus, to resolve the aforementioned problems, one may consider the elimination of the problems of the effect of chromatic aberration and of lengthening of the measurement time due to the use of a wide band light source by measuring the thickness of the object of measurement through relatively narrow band measurement.

However, it is generally known that the uncertainty of analysis based on spectral interference fringes is determined by the inverse of the frequency band of the light source, and hardly any difference that would allow the discrimination of thickness on the order of several μm, as in an etching mask or the like, appears in an interference spectrum obtained from a relatively narrow band light source. In order to discriminate changes in thickness based on this sort of interference spectrum, it is necessary for an ideal interference spectrum which approximates the theoretic waveform to be observed with good precision. However, observed spectra which are actually obtained contain distortion and noise due to the effects of the emission spectrum of the light source itself, the bias spectrum due to the optical system, and other interference light components. Thus, even if curve fitting is performed on the observed interference spectrum, variability in the measured thickness values occurs due to spectrum distortion, and measuring the true thickness of the object of measurement with high precision is difficult.

This invention was made to resolve the aforementioned problem, one object of this invention being to provide a thickness monitoring device, etching depth monitoring device and thickness monitoring method which allow thickness measurement of an object of measurement to be performed in real time even when using a relatively narrow band light source.

As a result of research efforts by the present inventors intended to achieve the aforementioned object, it was discovered that only the spectrum due to the thickness of the object of measurement can be extracted with good precision from the observed spectrum, even when a relatively narrow band light source is used, by focusing on the change over time of a plurality of single-wavelength components contained in the observed interference spectrum. Namely, the thickness monitoring device according to a first aspect of this invention comprises a light source which produces measurement light having a predetermined wavelength bandwidth; a detection unit which detects, for each wavelength, the interference light of measurement light reflected from the object of measurement whereof the thickness changes over time; and a thickness computation unit which computes the thickness of the object of measurement based on change over time of a plurality of single-wavelength components of the interference light detected by the detection unit.

In the thickness monitoring device according to a first aspect of this invention, by providing a light source which produces measurement light having a predetermined wavelength bandwidth and a thickness computation unit which computes the thickness of an object of measurement based on change over time of a plurality of single-wavelength components of interference light detected by a detection unit, as described above, it is possible to extract the change over time of an interference component due to thickness of the object of measurement based on the change over time of the single-wavelength components contained in the interference light. Furthermore, by extracting the change over time of the interference component due to thickness of the object of measurement for each of the plurality of single-wavelength components contained in the observed spectrum, it is possible to extract only the interference spectrum due to thickness of the object of measurement with high precision from the observed spectrum. As a result, even when a relatively narrow band light source having a predetermined wavelength bandwidth is used, it is possible to eliminate the effect of distortion or noise of the observed spectrum and perform high precision thickness measurement, and by using a relatively narrow band light source of high luminance which does not require prolonging the exposure time, thickness measurement of an object of measurement can be performed in real time.

In a thickness monitoring device according to the aforementioned first aspect, preferably, the object of measurement is an etching mask whereof the thickness changes during etching, and the detection unit is configured to detect reflected light from the top surface of the etching mask and reflected light which is reflected from the boundary surface on the side opposite to the etching mask. This sort of configuration makes it possible to implement high precision mask thickness measurement through relatively narrow band measurement of etching masks with a thickness on the order of several µm.

In a thickness monitoring device according to the first aspect described above, preferably, the thickness computation unit is configured to detect the phase of each wavelength component at a predetermined time based on change over time of a plurality of single-wavelength components, and to compute the thickness of the object of measurement at a predetermined time based on the phase of each detected wavelength component at the predetermined time. If this sort of configuration is employed, by using the phase of individual wavelength components at a predetermined time, there will be no need to consider the amplitude (signal strength) of each wavelength component contained in the observed spectrum, making it possible to eliminate differences in signal strength of each wavelength (spectral distortion) due to the effects of bias spectrum and the like. As a result, it is possible to extract only the interference spectrum due to the thickness of the object of measurement with good precision.

In this case, preferably, the thickness computation unit is configured to detect the phase of each wavelength component at a prescribed time by performing fitting-based waveform analysis on the change over time of a plurality of single-wavelength components. By employing this sort of configuration, it is possible to precisely detect the phase of the interference component due to thickness of the object of measurement based on change over time of the single-wavelength components after noise and interference light components other than those from the object of measurement have been removed through fitting.

In the above-described configuration for computing the thickness of an object of measurement based on the phase of wavelength components at a prescribed time, preferably, the thickness computation unit is configured so as to compute the thickness of the object of measurement at a prescribed time by analyzing a waveform in which the phase of each wavelength component detected at the prescribed time has been plotted for each wavelength. If this configuration is employed, by plotting the phase of the wavelength components at a predetermined time for each wavelength, the interference spectrum due to the thickness of the object of measurement can be obtained as a phase distribution from which the effects of bias spectrum, etc. have been eliminated. As a result, an interference spectrum approximated to the theoretical waveform can be obtained, making it possible to compute the thickness of the object of measurement at a predetermined time easily and with high precision.

In this case, preferably, the thickness computation unit is configured so as to compute the thickness of the object of measurement at a predetermined time through fitting-based analysis of a waveform in which the phase of wavelength components detected at a predetermined time has been plotted for each wavelength. If such a configuration is employed, the obtained interference spectrum (phase distribution) will match the theoretical waveform with good precision, so the thickness of the object of measurement at a predetermined time can be computed with high precision through fitting. Furthermore, unlike frequency analysis such as FFT, high precision analysis is possible even in cases where the bandwidth is narrow.

In a thickness monitoring device according to the first aspect described above, preferably, the thickness computation unit is configured so as to successively compute the thickness of the object of measurement in real time during etching using the thickness computation results for the object of measurement at a prescribed time as a reference point. If this configuration is employed, if the thickness has been measured with high precision once at a prescribed time, thickness control of the object of measurement can be easily performed in real time just by detecting the change in thickness with the passage of time.

In this case, preferably, the thickness computation unit is configured to estimate the range of variation of thickness of the object of measurement based on the relationship between the maximum value or minimum value of a predetermined single-wavelength component contained in the interference light after a predetermined time and the thickness of the object of measurement, and to compute the thickness of the object of measurement based on the estimation results. Here, when reflected light from the top surface of the object of measurement interferes with reflected light which has passed through the top surface and has been reflected from the boundary surface on the opposite side, whenever a maximum or minimum value appears in the change over time of a single wavelength, a thickness change corresponding to one quarter of the wavelength occurs. The chronological change in thickness of the object of measurement can be estimated within a range of variation of one quarter wavelength based on this relationship. As a result, it suffices to focus only on being within the estimated range of variation, making it possible to easily detect change in thickness of the object of measurement after the predetermined time.

In a thickness monitoring device according to the first aspect described above, preferably, the light source is a superluminescent diode. Using a superluminescent diode for the light source in this manner allows one to obtain a light source which has a relatively narrow band wavelength bandwidth and is capable of producing high luminance measurement light.

An etching depth monitoring device according to a second aspect of this invention comprises a light source which produces measurement light having a predetermined wavelength bandwidth; a detection unit which detects interference light of measurement light reflected from the etching mask for each wavelength; a mask film thickness computation unit which computes the etching mask film thickness based on change over time of a plurality of single-wavelength components of the interference light detected by the detection unit; and an etching mask depth computation unit which measures the etching depth of the object of measurement based on the etching mask film thickness computation results from the mask film thickness computation unit and the interference light detected by the detection unit.

In an etching depth monitoring device according to a second aspect of this invention, by providing a light source which produces measurement light having a predetermined wavelength bandwidth and a mask film thickness computation unit which computes the film thickness of an etching mask based on change over time of a plurality of single-wavelength components of interference light detected by a detection unit, as described above, it is possible to extract the change over time of an interference component due to mask thickness based on the change over time of the single-wavelength components contained in the interference light. Furthermore, by extracting the change over time of the interference component due to mask thickness for each of the plurality of single-wavelength components contained in the observed spectrum, it is possible to extract only the interference spectrum due to mask thickness with high precision from the observed spectrum. As a result, even when a relatively narrow band light source having a predetermined wavelength bandwidth is used, it is possible to eliminate the effect of distortion or noise of the observed spectrum and perform high precision mask thickness measurement, and by using a relatively narrow band light source of high luminance which does not require prolonging the exposure time, mask thickness measurement can be performed in real time. Moreover, when a wide band light source is used for mask thickness measurement, prolonged measurement becomes necessary, and thus it is necessary to separately provide a dedicated measurement light optical system and a high luminance light source such as a single wavelength laser for measurement of etching depth. By contrast, in the present invention, there is no need to use a wide band light source, making it possible to perform both measurement of mask thickness and measurement of etching depth with the same light source and measurement optical system. As a result, the device configuration can be simplified and the device can be made more compact.

The thickness monitoring method according to a third aspect of this invention comprises a step of producing measurement light having a predetermined wavelength bandwidth; a step of detecting interference light of measurement light reflected from an object of measurement whereof the thickness changes over time; and a step of computing the thickness of the object of measurement based on change over time of a plurality of single-wavelength components of the interference light detected by the step of detecting.

In the thickness monitoring method according to a third aspect of this invention, by providing a step of producing measurement light having a predetermined wavelength bandwidth, and a step of computing the thickness of the object of measurement based on change over time of a plurality of single-wavelength components of the interference light detected by a detection unit, as described above, it is possible to extract the change over time of the interference component due to thickness of the object of measurement based on changed over time of single-wavelength components contained in the interference light. Furthermore, by extracting the change over time of the interference component due to thickness of the object of measurement for each of the plurality of single-wavelength components contained in the observed spectrum, it is possible to extract only the interference spectrum due to thickness of the object of measurement from the observed spectrum with good precision. As a result, even when a relatively narrow band light source having a predetermined wavelength bandwidth is used, it is possible to eliminate the effect of distortion or noise of the observed spectrum and perform high precision thickness measurement, and by using a relatively narrow band light source of high luminance which does not require prolonging the exposure time, thickness measurement of an object of measurement can be performed in real time.

According to the present invention, as described above, the measurement of thickness of an object of measurement can be performed in real time even when a relatively narrow band light source is used.

BRIEF DESCRIPTION OF THE DRAWINGS (FIG. 1) A schematic drawing illustrating the overall configuration of an etching monitoring device according to a mode of embodiment of the present invention.

(FIG. 2) An enlarged cross-sectional view schematically illustrating the measurement light projection location in the etching monitoring device shown in FIG. 1.

(FIG. 3) A drawing showing a theoretical spectrum waveform of an A-B interference component.

Figure 3:
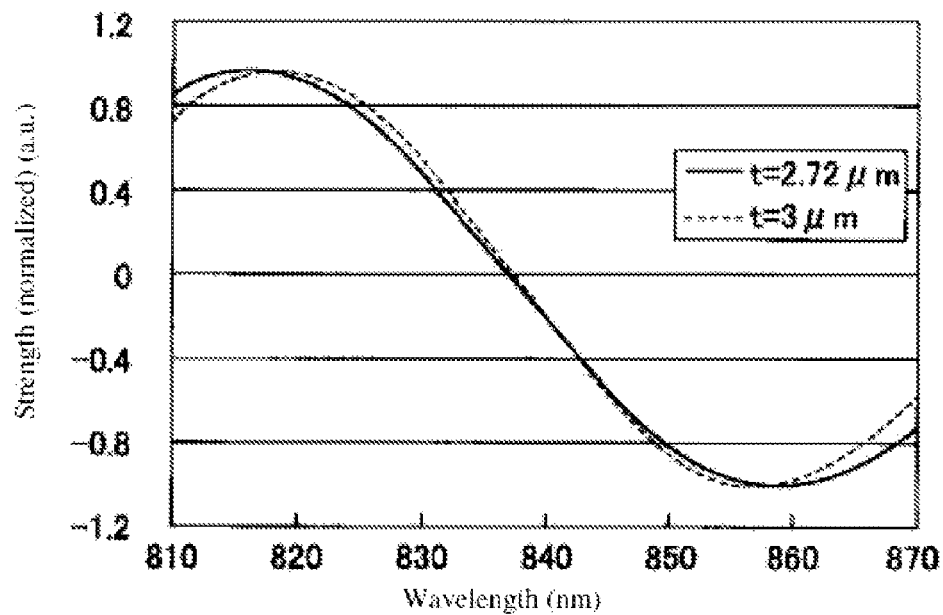

(FIG. 4) A drawing showing an example of curve fitting results for the interference spectrum shown in FIG. 3.

(FIG. 5) A drawing schematically illustrating an example of an observed spectrum in the etching monitoring device shown in FIG. 1.

Figure 5:
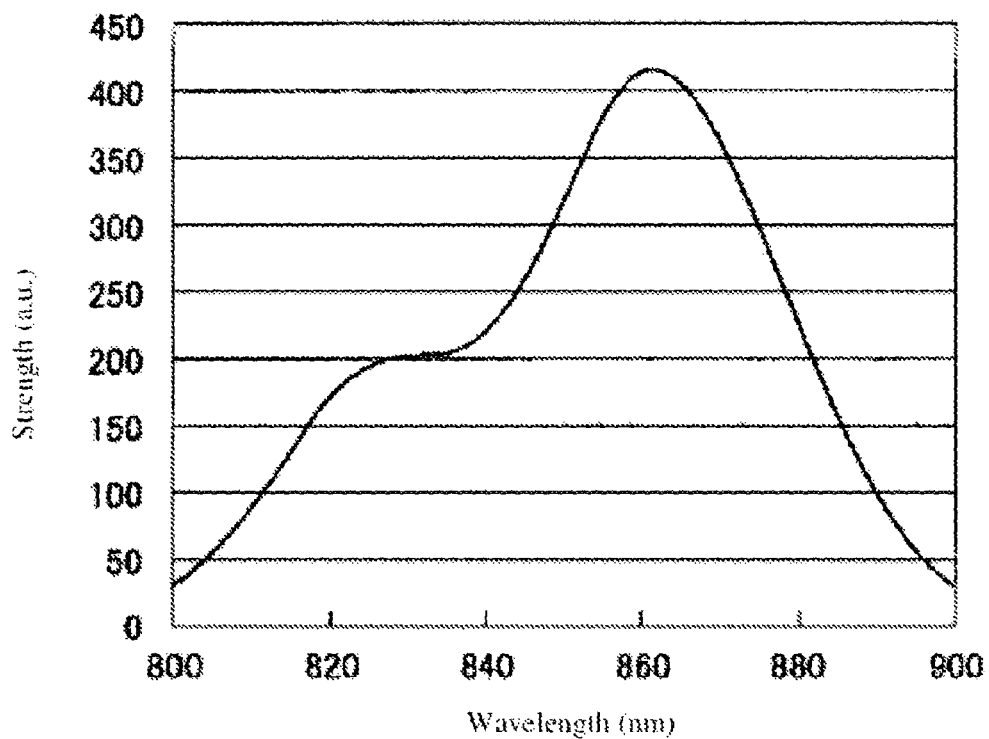

(FIG. 6) A drawing schematically illustrating change over time of a single-wavelength component contained in the observed spectrum shown in FIG. 5.

Figure 6:
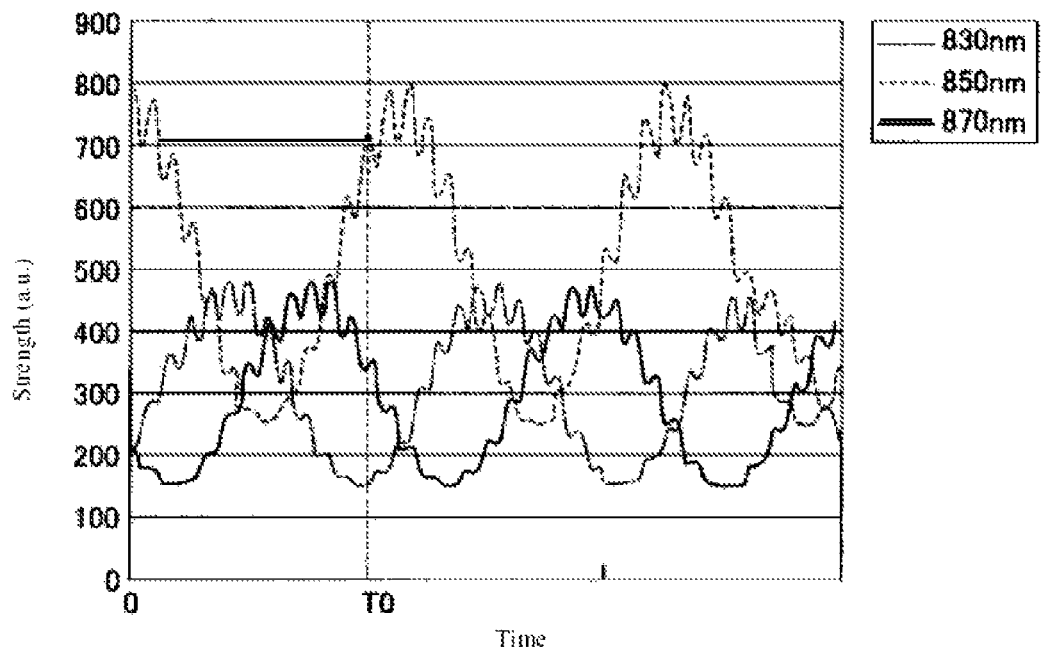

(FIG. 7) A drawing illustrating an example of fitting for change over time of the waveform for a single-wavelength component (850 nm) shown in FIG. 6.

(FIG. 8) A drawing showing the normalized distribution of amplitude values for fitted single-wavelength components at time T0.

(FIG. 9) A drawing showing the normalized distribution of phase values for fitted single-wavelength components at time T0.

(FIG. 10) A flow chart intended to explain the monitoring process of an etching monitoring device according to a mode of embodiment of the present invention.

(FIG. 11) A drawing schematically illustrating an example of an observed spectrum in the etching monitoring device shown in FIG. 1.

Figure 11:
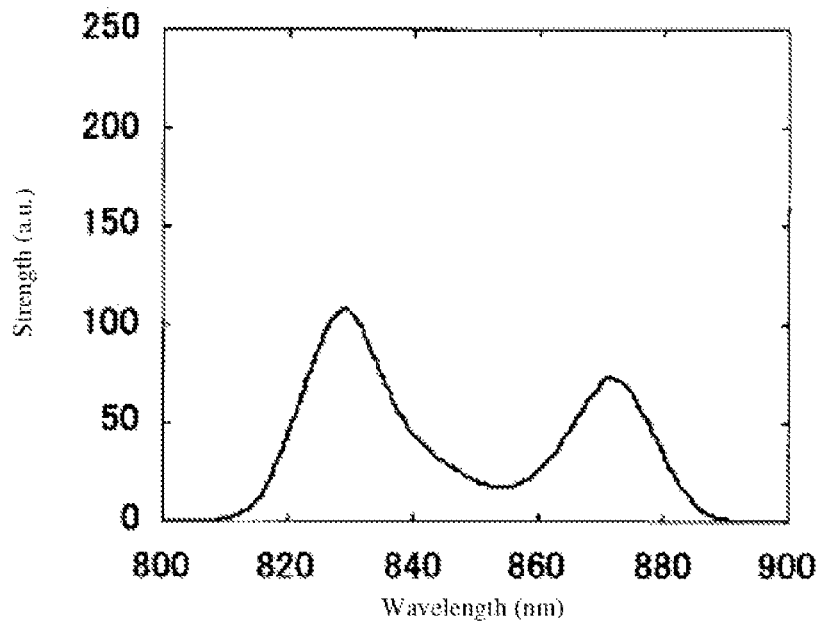

(FIG. 12) A drawing showing an example of etching depth measurement results based on a fast Fourier transform for the observed spectrum shown in FIG. 11.

DETAILED DESCRIPTION OF THE EXEMPLARY EMBODIMENT

A specific mode of embodiment of the present invention will be described below based on the drawings.

First, referring to FIG. 1 and FIG. 2, the overall configuration of an etching monitoring device 100 according to a mode of embodiment of the present invention will be described. In the present mode of embodiment, an example will be described in which the present invention has been applied to an etching monitoring device 100 which constitutes an example of a thickness monitoring device and etching depth monitoring device.

The etching monitoring device 100 according to the present mode of embodiment is a device which measures, in real time, a distance (depth, thickness) which changes moment to moment, for example, the depth of a trench being formed in a specimen 9 undergoing etching by a plasma etching device. As shown in FIG. 2, specimen 9 comprises a substrate 91 composed of silicon, and an etching mask (hereinafter referred to as "mask") 92 formed in a predetermined pattern on the top surface of the substrate 91. As shown in FIG. 1, etching monitoring device 100 comprises a light source 1, a measurement optical system 2, a spectrometric unit 3, and a data processing unit 4. Light source 1 and measurement optical system 2 are connected by optical fiber 21. Similarly, measurement optical system 2 and spectrometric unit 3 are connected via optical fiber 23. It will be noted that data processing unit 4 is an example of the "thickness computation unit," "mask film thickness computation unit" and "etching depth computation unit" of the present invention. Mask 92 is an example of the "object of measurement" of the present invention.

Light source 1 has a predetermined wavelength bandwidth. The wavelength bandwidth is on the order of several tens of nm. As a specific example of light source 1, a superluminescent diode (SLD) having a wavelength bandwidth with a central wavelength of 850 nm and a full width at half maximum of 30 nm is favorably used. Other light sources having an approximately equivalent wavelength bandwidth may also be used as the light source 1.

Measurement optical system 2 mainly comprises optical fibers 21, 22 and 23, fiber coupler 24 and collimator lens 25. Measurement light produced by light source 1 is taken up into light source 1 side optical fiber 21, proceeds through fiber coupler 24, and is outputted into space from the specimen 9 side optical fiber 22. Measurement light outputted from the end of optical fiber 22 is projected through collimator lens 25 perpendicular to the top surface of specimen 9 inside etching chamber 8.

Figure 2:
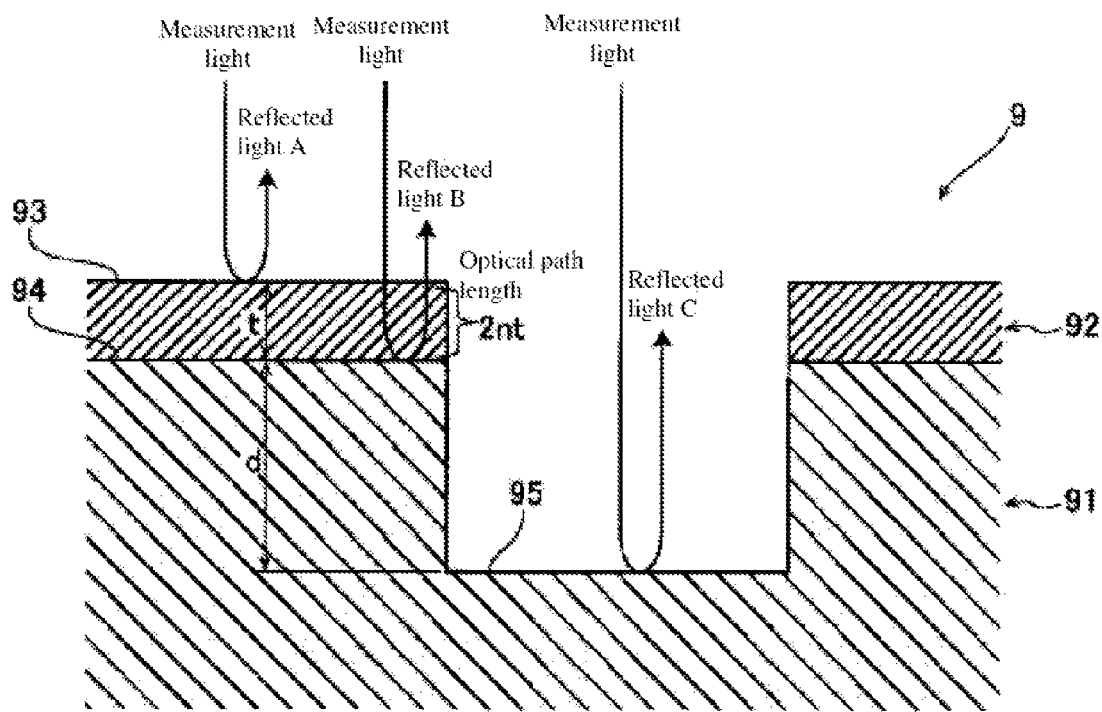

As shown in FIG. 2, during etching, the measurement light projected onto specimen 9 is reflected from the top surface 93 of the mask 92, the boundary surface 94 of the mask 92 and substrate 91, and the bottom surface 95 of the trench hole, which is the area being etched. As a result, the measurement light turns mainly into reflected light A from the top surface 93, reflected light B from the boundary surface 94 from measurement light which has passed through the mask 92, and reflected light C from the bottom surface 95, which interfere with each other. As shown in FIG. 1, these reflected lights A through C travel back through the collimator lens 25 in the opposite direction to the projection of measurement light and enter optical fiber 22.

Reflected lights A through C which have entered optical fiber 22 travels via fiber coupler 24 through spectrometric unit 3 side optical fiber 23 and arrives at spectrometric unit 3. The individual reflected lights A through C thoroughly interfere while passing through optical fibers 22 and 23 before they reach the spectrometric unit 3, forming interference light.

The spectrometric unit 3 mainly comprises a spectrometric unit such as diffraction grating 31, etc., and an array detector 32 of CCD line sensors or the like. In the spectrometric unit 3, interference light is dispersed into individual wavelengths by diffraction grating 31, and light of multiple wavelengths is simultaneously detected by array detector 32. Array detector 32 inputs a detection signal corresponding to each wavelength of the spectrally separated interference light into data processing unit 4. As a result, a spectrum waveform (observed spectrum) of spectrally separated interference light is acquired by data processing unit 4. It will be noted that array detector 32 is an example of the "detection unit" of the present invention.

Data processing unit 4 is composed of a personal computer, for example. The personal computer functions as data processing unit 4 by executing preinstalled data processing software. Data processing unit 4 successively acquires the observed spectrum inputted from array detector 32, and computes the thickness t (see FIG. 2) of specimen 9 based on the observed spectrum waveform that was acquired. Furthermore, data processing unit 4 computes the etching depth d (see FIG. 2) of a trench hole using the observed spectrum waveform that was acquired and the calculated mask thickness t. The computation of mask thickness t and the computation of etching depth d are performed successively along with the continued acquisition of the observed spectrum. The etching monitoring device 100 thereby performs real time monitoring of the mask thickness t and etching depth d which change as the etching process progresses.

Next, the method of measuring the mask thickness t according to the present mode of embodiment will be described with reference to FIG. 2 through FIG. 9.

As shown in FIG. 2, a mixture of three interference fringes, from A-B interference (interference of reflected lights A and B), B-C interference (interference of reflected lights B and C) and A-C interference (interference of reflected lights A and C) is present in the observed spectrum of the interference light detected during etching. The spectrum obtained here is represented by the following formula (1).

Mathematical formula 1

$$|A+B+C|^2 = \left| A\exp\left(kx+\omega T+\frac{0}{\lambda}\times 2\pi\right) + B\exp\left(kx+\omega T+\frac{2nt}{\lambda}\times 2\pi\right) + C\exp\left(kx+\omega T+\frac{2(d+t)}{\lambda}\times 2\pi\right) \right|^2 \quad (1)$$
$$= A^2+B^2+C^2+2AB\cos\left(\frac{2nt}{\lambda}\times 2\pi\right) + 2BC\cos\left(\frac{2(d+t-nt)}{\lambda}\times 2\pi\right) + 2CA\cos\left(\frac{2(d+t)}{\lambda}\times 2\pi\right)$$

Here, A, B and C are the amplitudes of reflected light A, reflected light B and reflected light C respectively. n is the index of refraction of the mask, t is the mask thickness, d is the etching depth, k is wavenumber, x is spatial position, w is frequency and T is time. Here, the A-B interference component due to mask thickness t is represented by the rightmost term ($\cos((2nt/\lambda)\times 2\pi)$) in the formula (1), and the spectrum of the A-B interference component is theoretically a cosine wave.

Figure 4:
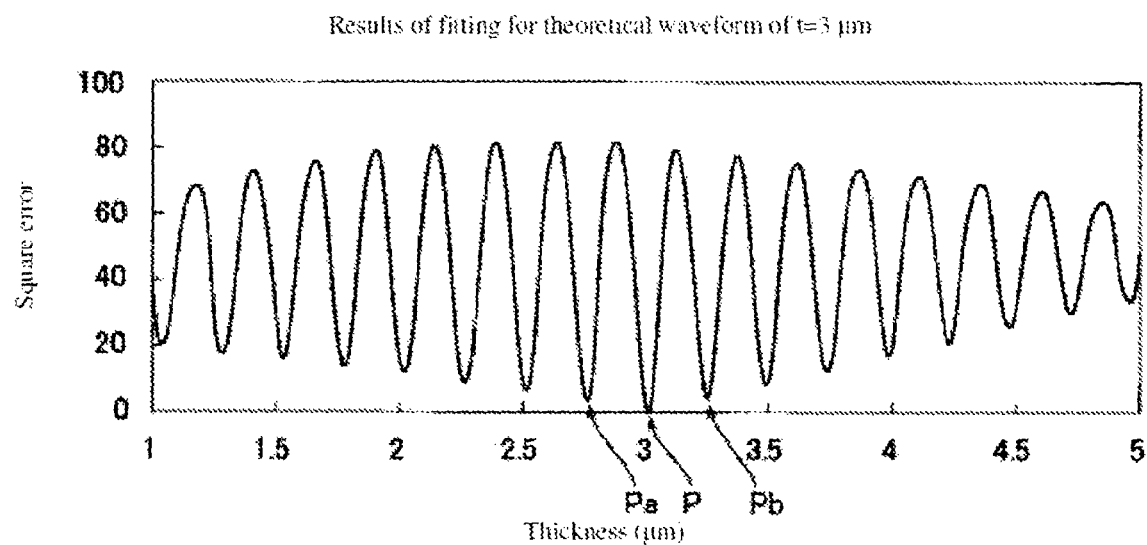

Here, as an example of the spectrum of the A-B interference component, the theoretical interference spectrum for a mask with an index of refraction n=1.5 and a thickness t=2.72 µm and t=3.00 µm is shown in FIG. 3. FIG. 4 shows the wavelength distribution of the evaluation function (square error) when curve fitting was performed on the interference spectrum for mask thickness t=3.00 µm shown in FIG. 3. As shown in FIG. 4, when fitting is performed with the theoretical interference spectrum for t=3.00 µm, square error naturally has a minimum value P at t=3 µm. In order to discriminate the two interference spectra when the spectral band is narrow, as in FIG. 3, it is necessary to observe an ideal interference spectrum approximated to the theoretical waveform, so that a clear difference occurs in the square error.

However, in the observed spectrum which is actually detected, as shown in FIG. 5, three interference fringes are overlaid onto a bias spectrum (the spectrum due to light source 1, measurement optical system 2, etc.) to which interference does not contribute. Thus, with fitting of an actual observed spectrum, results such as those shown in FIG. 4 cannot be obtained, and usually, a substantially equivalent peak (minimum value) appears at multiple points in the evaluation function due to spectral distortion and noise. For example, peaks Pa and Pb adjacent to the peak P representing the true mask thickness become substantially equal to or less than peak P. In this way, with actual measurement using a light source with a wavelength bandwidth on the order of several tens of nm, usually, multiple minimum values appear, so determining the true mask thickness t is problematic.

Thus, in the present mode of embodiment, the mask t at a predetermined time is estimated by using the change over time of the detected observed spectrum.

First, detection of interference light is performed over a predetermined period of time, and a continual observed spectrum (see FIG. 5) is acquired for a predetermined period of time.

Next, as shown in FIG. 6, change over time of multiple single wavelengths is extracted from the observed spectrum obtained for the predetermined time period. In FIG. 6, an example is shown only for three wavelengths of 830 nm, 850 nm and 870 nm. The aforementioned A-B interference, B-C interference and A-C interference components are overlaid onto the waveform of change over time of the wavelength components. The etching speed ratio (selection ratio) between mask 92 and silicon substrate 91 is generally 20 or more, so a cosine wave shaped waveform of long period and large amplitude is the A-B interference component due to mask thickness t. Furthermore, the additive component of B-C interference and A-C interference appears as a waveform with a shorter period and smaller amplitude.

Figure 7:
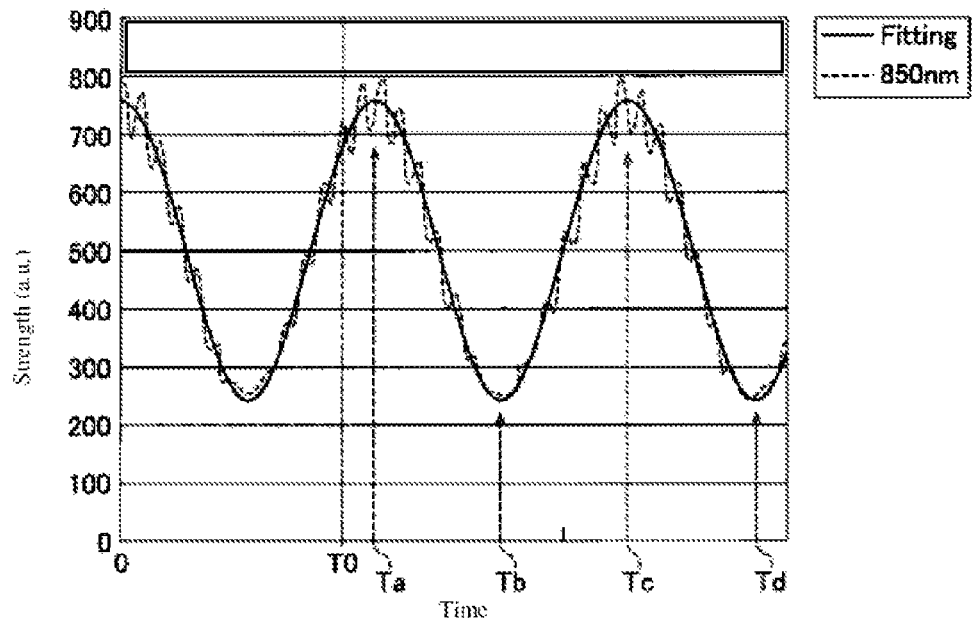

Here, as can be seen from FIG. 6, the intensity of the bias spectrum for each wavelength component does not change with the passage of time and is substantially constant chronologically. Thus, for an observed spectrum containing the bias spectrum as well, the waveform of change over time of an extracted single wavelength will have a substantially constant amplitude. Thus, as shown in FIG. 7, fitting is performed using a cosine wave for each waveform of change over time of extracted single wavelengths. FIG. 7 shows an example of fitting for the 850 nm wavelength component. As a result, only the change over time of the A-B interference component for a single wavelength is extracted as a cosine wave. Cosine wave fitting for the waveform of change over time of a single wavelength is carried out on the whole bandwidth of the observed spectrum by extracting multiple single wavelength components at a fixed wavelength interval (for example, a 2 nm interval). As a result, a cosine wave (waveform of change over time) corresponding to the A-B interference component at each wavelength is obtained.

Figure 8:
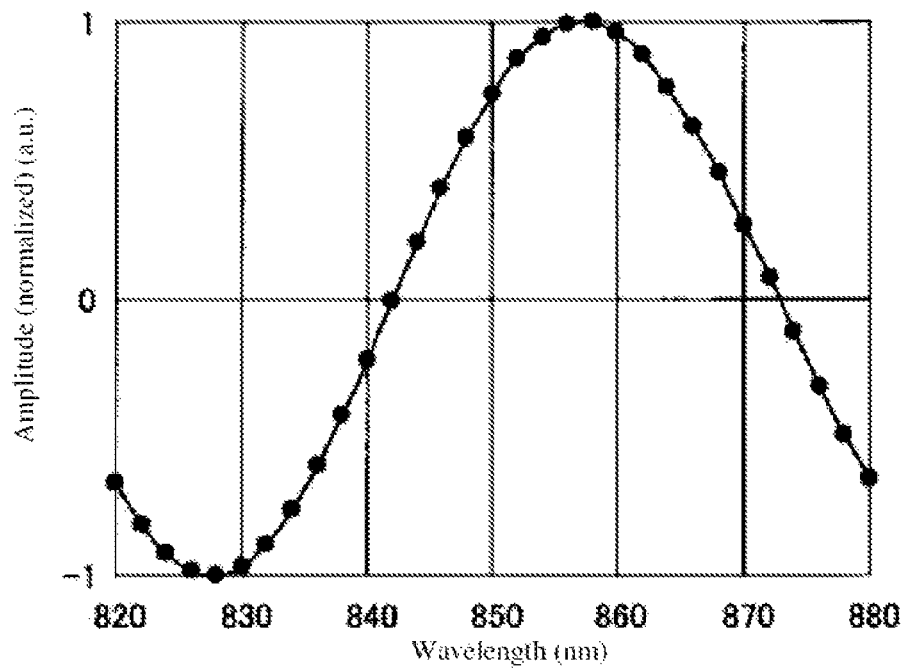

Furthermore, as shown in FIG. 8, amplitude of the cosine wave (waveform of change over time) of each wavelength obtained is normalized and the value of each wavelength component at time T0 is plotted on a strength (amplitude)-wavelength axis. Through cosine wave fitting, the interference spectrum of the A-B interference component can be obtained as a substantially complete cosine wave approximated to the theoretical waveform represented by the term $(\cos((2nt/\lambda)\times 2\pi))$ in the aforementioned formula (1).

Figure 9:
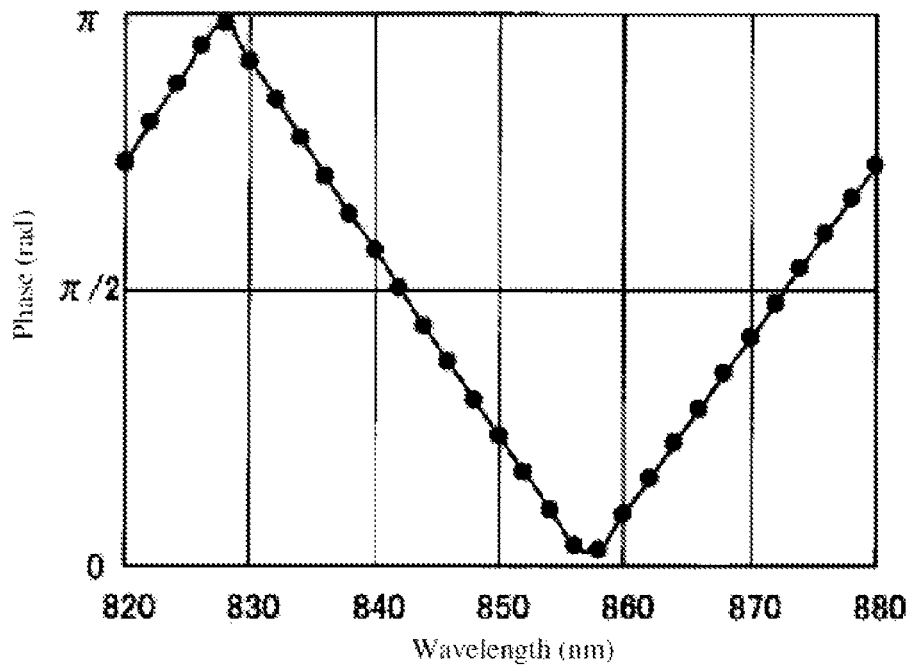

The phase distribution of FIG. 9 is obtained by converting the amplitude values of the graph shown in FIG. 8 to phase values using an arccosine function and plotting on a phase-wavelength axis. Fitting the distribution of the phase value $(2nt/\lambda)\times 2\pi$ of the A-B interference component $(\cos((2nt/\lambda)\times 2\pi))$ (see formula (1)) where mask thickness t has been converted to the obtained phase distribution at time T0, the mask thickness t0 at which the evaluation function has its minimum is obtained. Here, since the spectrum waveform which is the object of fitting has a substantially complete cosine waveform, the degree of match between the theoretical waveform of the A-B interference component and the obtained spectrum is extremely high, and the evaluation function (square error) shows a single clear peak (minimum value) as the same as described in FIG. 4. As a result, it becomes possible to measure the mask thickness t0 at time T0 with high precision.

The subsequent mask thickness t can be easily measured with high precision by taking the mask thickness t0 at time T0 as a reference point. Specifically, the change over time of any single wavelength λ (for example, 850 nm in FIG. 7) in the observed spectrum is focused on. If the optical path length 2nt (see FIG. 2) changes by half a wavelength (λ/2) due to change in mask thickness t, the phases of reflected lights A and B will match or be offset by half a wavelength, so the change over time of the wavelength λ will take on a maximum value or a minimum value. Namely, whenever the waveform of change over time for wavelength λ shows a maximum or minimum peak (times Ta through Td in FIG. 7), the mask thickness t changes by λ/4 in terms of optical path length. Therefore, change in the current mask thickness t can be estimated within a range of variation of ±λ/4 by monitoring the change over time of a single wavelength λ from time T0 (mask thickness t0).

Thus, even if multiple substantially equivalent minimum values (for example, peaks P, Pa and Pb in FIG. 4) appear in the evaluation function due to spectral distortion or the like, it is possible to keep the change of the current mask thickness t within the range of variation of λ/4. By limiting the mask thickness t to a range of variation of λ/4 in this way, it is possible for the mask thickness t after time T0 to be measured with high precision even by conventional methods such as curve fitting and frequency analysis (FFT, maximum entropy method, etc.).

Figure 10:
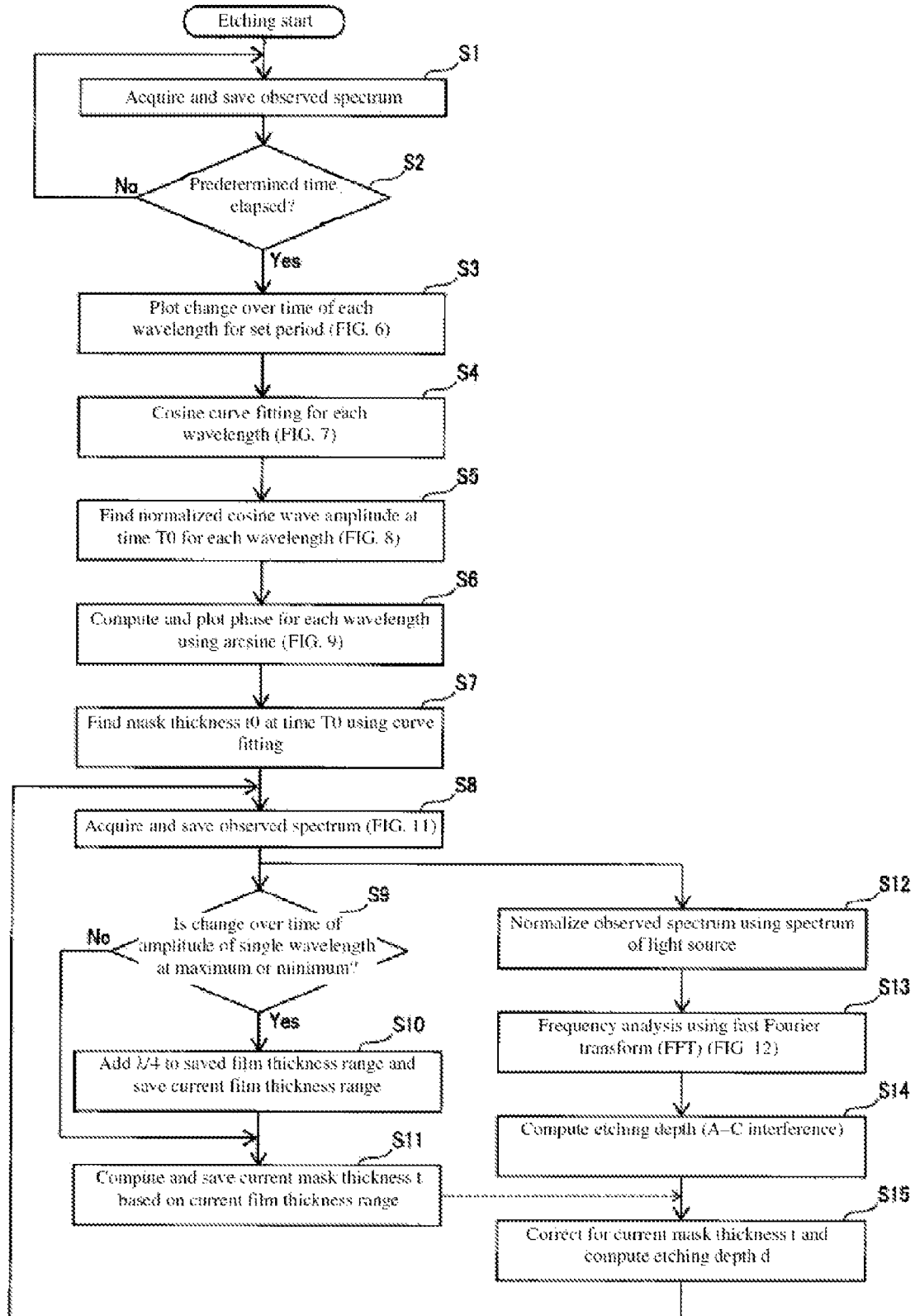
Figure 12:
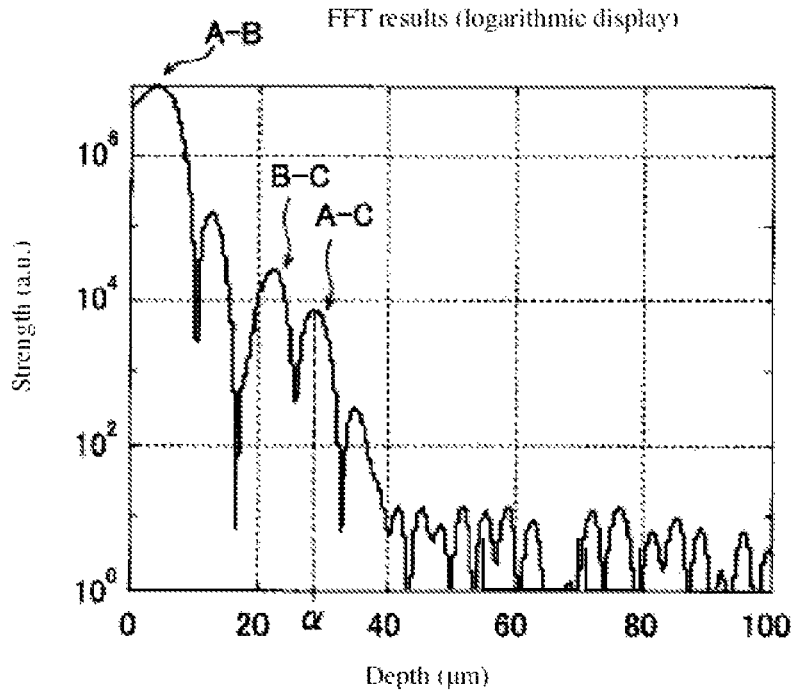

Next, referring to FIG. 10 through FIG. 12, the operation for monitoring mask thickness t and etching depth d in an etching process using the etching monitoring device 100 of the present mode of embodiment will be described. Each of the following processes is executed by data processing unit 4 after it has acquired observed spectrum data from array detector 32.

When the etching process is initiated, first, in steps S1 and S2, the observed spectrum is acquired by array detector 32 and saved for a set period of time.

In step S3, a plurality of single-wavelength components (for example, at 2 nm intervals) is extracted from the saved observed spectrum for a set period of time, and the change over time thereof is plotted (see FIG. 6). In step S4, curve fitting using a cosine wave (see FIG. 7) is carried out on the change over time of each single-wavelength component. Next, in step S5, a normalized amplitude value (see FIG. 8) is computed for each wavelength at the start of etching or at a predetermined time T0 after start of etching. Then, in step S6, the phase value of each wavelength component at time T0 is computed by an arccosine function. As a result, a distribution waveform (see FIG. 9) for phase-wavelength at time T0 of the A-B interference component is obtained. In step S7, curve fitting is performed on the obtained distribution waveform based on change of phase value $((2nt/\lambda)\times 2\pi)$ in the theoretical waveform of A-B interference (see FIG. 4). The mask thickness t0 at time T0 is thereby computed.

Once mask thickness t0 has been computed, in the subsequent processing, real time monitoring of mask thickness t (steps S9 through S11) and etching depth d (steps S12 through S15) are performed in parallel in real time based on mask thickness t0 at time T0. First, in step S8, as shown in FIG. 11, the latest observed vector is acquired from the array detector 32.

In step S9, it is evaluated whether the change over time of the amplitude of single wavelength λ is at an extreme value (maximum value or minimum value). If it is at an extreme value, in step S10, λ/4 is added to the range of variation of mask thickness t. As a result, the range of variation of the current mask thickness t is determined in accordance with the number of extreme values (times Ta through Td) since time T0 (see FIG. 7). In step S11, the current mask thickness t is determined on the basis of the estimation of change in mask thickness t and the results of curve fitting for successively obtained observed spectra.

Furthermore, in step S12, the observed spectrum is normalized using a known light emission spectrum of light source 1. In step S13, a normalized spectrum is replotted from the wavelength axis (horizontal axis) to the wavenumber axis, and frequency analysis based on fast Fourier transform (FFT) is performed on the obtained spectrum. As a result, as shown in FIG. 12, the peak location obtained through fast Fourier transform is associated directly with the etching depth d based on the relationship formula between the etching depth and wavenumber of the spectrum. As a result, a depth α corresponding to the peak location indicated by A-C interference is obtained in step S14. The depth α due to this A-C interference is equal to etching depth d+mask thickness t, so in step S15, the current etching depth d is obtained by correcting for the current mask thickness t. Real time monitoring of the mask thickness t and etching depth d is performed by successively executing the above steps S8 through S15 as observed spectra are acquired.

In the present mode of embodiment, as described above, by providing a light source 1 which produces measurement light having a predetermined wavelength bandwidth and a data processing unit 4 which computes mask thickness t based on change over time of a plurality of single-wavelength component in an observed spectrum detected by array detector 32, it is possible to extract the change over time of the A-B interference component due to mask thickness from the change over time of a single-wavelength component contained in the observed spectrum (see FIG. 7). Furthermore, by extracting the change over time of the A-B interference component for each of the single-wavelength components contained in the observed spectrum, it is possible to precisely extract only the A-B interference spectrum due to mask thickness from the observed spectrum (see FIG. 8 and FIG. 9). As a result, it is possible to eliminate the effect of noise and distortion of the observed spectrum and perform precise mask thickness measurement even when a light source 1 having a predetermined wavelength bandwidth is used, and by using a relatively narrow band light source 1 having high luminance and not requiring the prolongation of exposure time, measurement of mask thickness t can be performed in real time.

Furthermore, in the present mode of embodiment, as described above, there is no need to use a wide band light source, so it is possible to perform measurement of both mask thickness t and etching depth d with the same light source 1 and measurement optical system 2. It is thereby possible to simplify the device configuration of the etching monitoring device 100 and to make the device more compact.

Furthermore, in the present mode of embodiment, as described above, the data processing unit 4 is configured to compute the mask thickness t0 at time T0 based on the phase of wavelength components at a predetermined time T0. As a result, it is possible to eliminate differences in signal strength of each wavelength (spectral distortion) due to the effects of bias spectrum and the like from the observed spectrum by using the phase of each wavelength component at time T0 (see FIG. 9), and to detect only the A-B interference spectrum with good precision.

Furthermore, in the present mode of embodiment, as described above, the data processing unit 4 is configured to detect the phase of each wavelength component by performing cosine wave fitting on change over time of a plurality of single-wavelength components. As a result, it is possible to eliminate noise and other interference light components (B-C interference, A-C interference) through cosine wave fitting and detect the phase value of the A-B interference component from the waveform of change over time of a single-wavelength component (see FIG. 7) with good precision.

Furthermore, in the present mode of embodiment, as described above, the data processing unit 4 is configured to compute the mask thickness t0 at time T0 by analyzing a phase distribution waveform (see FIG. 9) wherein the phase of wavelength components at time T0 has been plotted on a phase-wavelength axis. It is thereby possible to obtain the A-B interference spectrum as a phase distribution in which the effect of bias spectrum, etc. has been removed. As a result, it is possible to obtain an A-B interference spectrum approximated to the theoretical waveform, making it possible to compute the mask thickness t0 at time T0 easily and with high precision.

Furthermore, in the present mode of embodiment, as described above, the data processing unit 4 is configured to compute the mask thickness t0 at time T0 by analyzing the phase distribution waveform (see FIG. 9) at time T0 through fitting. The obtained interference spectrum (phase distribution) matches the theoretical waveform with good precision, so the mask thickness t0 at time T0 can be computed with high precision through fitting. Furthermore, unlike frequency analysis such as FFT, precise analysis is possible even when the bandwidth is narrow.

Furthermore, in the present mode of embodiment, as described above, the data processing unit 4 is configured to successively compute the mask thickness t in real time during etching using the computation results for mask thickness t0 at time T0 during etching. As a result, by precisely measuring the mask thickness t0 once at time T0, it becomes possible to easily control the mask thickness t in real time simply by detecting the change in mask thickness t with the passage of time.

Furthermore, in the present mode of embodiment, as described above, the data processing unit 4 is configured to estimate the range of variation of mask thickness t based on the relationship whereby a change in mask thickness corresponding to $\lambda/4$ occurs whenever a minimum value or maximum value appears in the change over time of single wavelength $\lambda$, and to compute the mask thickness t based on the estimation results. It is thereby possible to estimate the chronological change of mask thickness t within a range of variation of $\lambda/4$. As a result, it suffices to focus only on being within the estimated range of variation ($\pm\lambda/4$), making it possible to easily detect the change of mask thickness t after time T0.

Furthermore, in the present mode of embodiment, as described above, light source 1 is a superluminescent diode. In this way, by using a superluminescent diode for light source 1, it is possible to obtain a light source capable of producing high luminance measurement light having a relatively narrow wavelength bandwidth.

It will be noted that the mode of embodiment which has been disclosed here should be considered in all respects to be illustrative and not limiting. The scope of the present invention is indicated by the scope of patent claims and not by the description of the foregoing mode of embodiment, and also includes all modifications within the scope of, and of equivalent meaning to, the scope of patent claims.

For example, in the mode of embodiment described above, an example was presented wherein the present invention was applied to an etching monitoring device which performs mask thickness monitoring of an etching mask, but the present invention is not limited thereto. For example, the present invention may also be applied to thickness monitoring of silicon substrates and thin films other than etching masks. In this case, it is possible to apply the present invention to monitoring of film thickness in the film growth process for various types of thin film and monitoring of substrate thickness in silicon substrate thinning processes.

Furthermore, in the above mode of embodiment, an example was presented wherein monitoring of etching depth was performed in addition to monitoring of mask thickness, but the present invention is not limited thereto. The present invention may also be configured to perform only monitoring of mask thickness.

Moreover, in the above mode of embodiment, an example was described wherein measurement of mask thickness t0 at time T0 is performed through fitting, but the present invention is not limited thereto. In the present invention, mask thickness t0 at time T0 may also be computed using FFT, the maximum entropy method and the like instead of fitting.

Furthermore, in the above mode of embodiment, an example was described wherein measurement of mask thickness t after time T0 was performed through fitting, but the present invention is not limited thereto. In the present invention, FFT, the maximum entropy method and the like may be used instead of fitting for mask thickness measurement after time T0. In this case as well, changes in mask thickness t can be narrowed down to within a range of variation equal to one quarter of an arbitrary wavelength λ contained in the observed spectrum, thus making high precision measurement possible.

Furthermore, in the above mode of embodiment, an example was presented wherein monitoring of etching depth was performed through FFT, but the present invention is not limited thereto. In the present invention, monitoring of etching depth may also be performed by other unit, such as fitting or frequency analysis based on the maximum entropy method rather than FFT. In this case as well, it is possible to perform high precision depth measurements by correcting etching depth measurement results using mask thickness measurement results obtained through high precision measurement.

Furthermore, in the above mode of embodiment, an example was presented wherein a single-wavelength component was extracted at 2 nm intervals from an observed spectrum for the measurement of mask thickness t0 at time T0, but the present invention is not limited thereto. In the present invention, the single-wavelength component may also be extracted at 1 nm intervals, or at intervals of 3 nm or greater. It suffices that the phase distribution waveform be sufficiently approximated to the theoretical waveform (cosine wave) of A-B interference so that the fitting evaluation function will not contain multiple minimum values. Namely, the extracted wavelength interval of single-wavelength components can be made an arbitrary wavelength interval within a range that allows the mask thickness to be uniquely identified. Thus, there is no need to extract single-wavelength components across the entire observed spectrum, it being sufficient to extract single-wavelength components within an adequate required wavelength range.

Furthermore, in the above mode of embodiment, an example was presented wherein, in the measurement of mask thickness t0, the distribution of phase values for the A-B interference component in the case where mask thickness t has been changed was fitted to the phase distribution at time T0 (see FIG. 9), but the present invention is not limited thereto. In the present invention, it is also possible to fit the amplitude distribution $(\cos((2nt/\lambda)\times 2\pi))$ of the A-B interference component to the amplitude-wavelength distribution of wavelength components at time T0 (see FIG. 8). In this case as well, the A-B interference component contained in the observed spectrum can be extracted as a substantially complete cosine wave, so similar measurement results can be obtained.

EXPLANATION OF REFERENCES

1 Light source
4 Data processing unit (thickness computation unit, mask film thickness computation unit, etching depth computation unit)
32 Array detector (detection unit)
92 Mask (object of measurement, etching mask)
100 Etching monitoring device (thickness monitoring device, etching depth monitoring device)

What is claimed is:
1. A thickness monitoring device comprising:
   a light source which produces a measurement light having a predetermined wavelength bandwidth;
   a detection unit which detects, for each wavelength, interference light of said measurement light reflected from an object of measurement whereof the thickness changes over time; and
   a thickness computation unit which computes the thickness of said object of measurement based on change over time of a plurality of single-wavelength components of the interference light detected by said detection unit,
   wherein the thickness computation includes extracting a value at a predetermined time of each of said plurality of single wavelengths.
2. A thickness monitoring device as described in claim 1, wherein said object of measurement is an etching mask whereof the thickness changes during etching; and
   said detection unit is configured to detect, for each wavelength, interference light of reflected light from the top surface of said etching mask and reflected light which is reflected from the boundary surface on the side opposite to said etching mask.
3. A thickness monitoring device as described in claim 1, wherein said thickness computation unit is configured to detect the phase of each wavelength component at said predetermined time based on change over time of said plurality of single-wavelength components, and to compute the thickness of said object of measurement at said predetermined time based on the phase of each wavelength component detected at said predetermined time.
4. A thickness monitoring device as described in claim 3, wherein said thickness computation unit is configured to perform fitting-based waveform analysis on change over time of a plurality of single-wavelength components, and to detect the phase of each wavelength component at said predetermined time.
5. A thickness monitoring device as described in claim 3, wherein said thickness computation unit is configured to compute the thickness of said object of measurement at said predetermined time by analyzing a waveform wherein the detected phase of each wavelength component at said predetermined time is plotted for each wavelength.
6. A thickness monitoring device as described in claim 5, wherein said thickness computation unit is configured to compute the thickness of said object of measurement at a predetermined time through analysis, by fitting, of a waveform wherein the detected phase of each wavelength component at said predetermined time is plotted for each wavelength.
7. A thickness monitoring device as described in claim 1, wherein said thickness computation unit is configured to successively compute the thickness of said object of measurement in real time during etching using the thickness computation results for said object of measurement at said predetermined time as a reference point.
8. A thickness monitoring device as described in claim 7, wherein said thickness computation unit is configured to estimate the range of variation of thickness of said object of measurement based on the relationship between maximum values or minimum values of a predetermined single-wavelength component contained in interference light after said predetermined time and the thickness of said object of measurement, and to compute the thickness of said object of measurement based on the estimation results.
9. A thickness monitoring device as described in claim 1, wherein said light source is a superluminescent diode.

10. An etching depth monitoring device comprising:
a light source which produces a measurement light having a predetermined wavelength bandwidth;
a detection unit which detects, for each wavelength, interference light of said measurement light reflected from an etching mask;
a mask film thickness computation unit which computes the film thickness of said etching mask based on change over time of a plurality of single-wavelength components of the interference light detected by said detection unit; and
an etching depth computation unit which measures the etching depth of said object of measurement based on the computation results for film thickness of said etching mask from said mask film thickness computation unit and interference light detected by said detection unit;
wherein the etching depth measurement includes extracting a value at a predetermined time of each of said plurality of single wavelengths.

11. A thickness monitoring method comprising a step of generating measurement light having a predetermined wavelength bandwidth;
a step of detecting, for each wavelength, interference light of said measurement light reflected form an object of measurement whereof the thickness changes over time; and
a step of computing the thickness of said object of measurement based on change over time of a plurality of single-wavelength components in the interference light detected by said step of detecting;
wherein the thickness computation includes extracting a value at a predetermined time of each of said plurality of single wavelengths.

12. A thickness monitoring device comprising:
a light source which produces a measurement light having a predetermined wavelength bandwidth;
a detection unit which detects, for each wavelength, interference light of said measurement light reflected from an object of measurement whereof the thickness changes over time; and
a thickness computation unit which computes the thickness of said object of measurement based on change over time of a plurality of single-wavelength components of the interference light detected by said detection unit,
wherein said thickness computation unit is configured to detect the phase of each wavelength component at said a predetermined time based on change over time of said plurality of single-wavelength components, and to compute the thickness of said object of measurement at a predetermined time based on the phase of each wavelength component detected at said predetermined time.

* * * * *